(12) United States Patent
Thirunagari et al.

(10) Patent No.: US 7,539,244 B2
(45) Date of Patent: May 26, 2009

(54) RECEIVER FOR PERFORMING ADAPTIVE EQUALIZATION AND METHOD

(75) Inventors: Krishna B. Thirunagari, Glendale, AZ (US); Giorgio Mariani, Phoenix, AZ (US)

(73) Assignee: STMicroelectronics, Inc., Carrollton, TX (US)

( * ) Notice: Subject to any disclaimer, the term of this patent is extended or adjusted under 35 U.S.C. 154(b) by 504 days.

(21) Appl. No.: 10/953,710

(22) Filed: Sep. 29, 2004

(65) Prior Publication Data

US 2006/0067397 A1 Mar. 30, 2006

(51) Int. Cl.
*H03H 7/30* (2006.01)
*H03H 7/40* (2006.01)
*H03K 5/159* (2006.01)
*H03K 9/00* (2006.01)
*H04B 14/06* (2006.01)

(52) U.S. Cl. .................. 375/232; 375/350; 375/316; 375/229

(58) Field of Classification Search ............ 375/350, 375/232, 229, 230
See application file for complete search history.

(56) References Cited

U.S. PATENT DOCUMENTS

| 4,275,453 | A | * | 6/1981 | Wagner ...................... 708/819 |
| 4,365,119 | A | * | 12/1982 | Chung et al. ............ 379/406.06 |
| 5,046,105 | A | * | 9/1991 | Bohn .......................... 381/98 |
| 5,257,286 | A | * | 10/1993 | Ray .......................... 375/230 |
| 5,282,023 | A | * | 1/1994 | Scarpa ....................... 348/624 |
| 5,592,340 | A | * | 1/1997 | Minuhin et al. ............... 360/46 |
| 6,956,360 | B2 | * | 10/2005 | Matsuura et al. ............ 323/283 |
| 2006/0140262 | A1 | * | 6/2006 | Kuijk et al. ................. 375/232 |

* cited by examiner

*Primary Examiner*—David C Payne
*Assistant Examiner*—Brian J. Stevens
(74) *Attorney, Agent, or Firm*—Lisa K. Jorgenson; Willam A. Munck

(57) ABSTRACT

A receiver includes a filter capable of receiving an input signal and generating an output signal. The filter provides a transfer function. The filter includes a first stage capable of adjusting a pole and a first zero of the transfer function. The filter also includes a second stage capable of adjusting a second zero of the transfer function. In addition, the filter includes a third stage capable of adjusting a third zero of the transfer function.

14 Claims, 7 Drawing Sheets

RECEIVER FOR PERFORMING ADAPTIVE EQUALIZATION AND METHOD

CROSS REFERENCE TO RELATED APPLACATIONS

This patent application is related to U.S. patent application Ser. No. 10/953,707 filed on Sep. 29, 2004 entitled "APPARATUS AND METHOD FOR PERFORMING ADAPTIVE EQUALIZATION IN A RECEIVER".

TECHNICAL FIELD

This disclosure is generally directed to communication systems and more specifically to a receiver for performing adaptive equalization and method.

BACKGROUND

Conventional receivers often receive signals that are distorted during transmission. For example, an Ethernet transmitter and an Ethernet receiver often communicate over a category-5 ("cat-5") cable, and the transmitter and receiver are often connected to the cable by transformers. The transformers and the cable itself typically alter the signals transmitted between the transmitter and receiver.

Conventional receivers typically include a mechanism to perform equalization on an incoming signal. The equalization at least partially corrects for the distortion of the incoming signal caused during transmission. A problem with conventional receivers is that the equalization technique used is often sensitive to both process variations and temperature variations. This means that variations in the production of the receivers as well as the operating temperatures of the receivers may affect the equalization of an incoming signal. Also, conventional receivers typically use more complex architectures to perform the equalization. This typically increases the size of the circuits needed to perform the equalization.

SUMMARY

This disclosure provides a receiver for performing adaptive equalization and method.

In one aspect, a receiver includes a filter capable of receiving an input signal and generating an output signal. The filter provides a transfer function. The filter includes a first stage capable of adjusting a pole and a first zero of the transfer function. The filter also includes a second stage capable of adjusting a second zero of the transfer function. In addition, the filter includes a third stage capable of adjusting a third zero of the transfer function.

In another aspect, a filter is capable of providing a transfer function. The filter includes a first stage capable of adjusting a pole and a first zero of the transfer function. The filter also includes a second stage capable of adjusting a second zero of the transfer function. In addition, the filter includes a third stage capable of adjusting a third zero of the transfer function.

In yet another aspect, a method includes receiving an input signal at a filter having a first stage, a second stage, and a third stage. The first stage is capable of adjusting a pole and a first zero of a transfer function. The second stage is capable of adjusting a second zero of the transfer function. The third stage is capable of adjusting a third zero of the transfer function. The method also includes generating an output signal using the filter and adjusting at least one of the pole, the first zero, the second zero, and the third zero.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
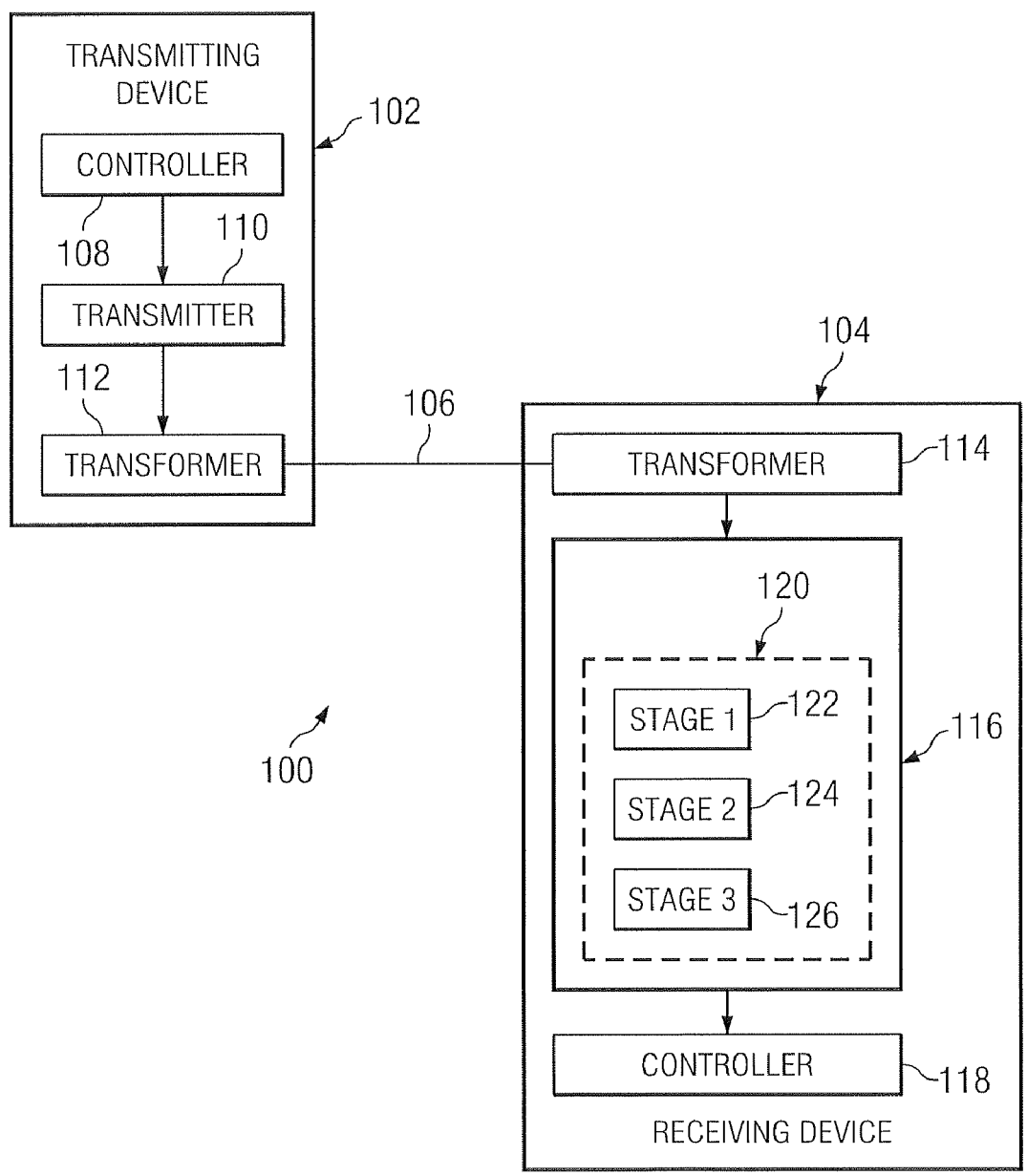
FIG. 1 illustrates an example communication system according to one embodiment of this disclosure.

FIG. 1 illustrates an example communication system 100 according to one embodiment of this disclosure. In this example embodiment, the system 100 includes a transmitting device 102, a receiving device 104, and a communication link 106. This embodiment of the system 100 is for illustration only. Other embodiments of the system 100 may be used without departing from the scope of this disclosure.

The transmitting device 102 is coupled to the communication link 106. In this document, the term "couple" and its derivatives refer to any direct or indirect communication between two or more elements, whether or not those elements are in physical contact with one another. The transmitting device 102 represents any device capable of communicating over the communication link 106. For example, the transmitting device 102 could represent a computing device capable of communicating using the Ethernet protocol, such as a desktop computer, laptop computer, server computer, or other device. The transmitting device 102 includes any hardware, software, firmware, or combination thereof for transmitting information over a communication link 106.

In the illustrated example, the transmitting device 102 includes a controller 108, a transmitter 110, and a transformer 112. The controller 108 represents any controller capable of generating or otherwise providing information to be transmitted over the communication link 106. For example, the controller 108 could represent a microprocessor, digital signal processor ("DSP"), application-specific integrated circuit ("ASIC"), or field-programmable gate array ("FPGA").

The transmitter 110 is coupled to the controller 108 and the transformer 112. The transmitter 110 encodes the information provided by the controller 108 and communicates a signal containing the encoded information over the communication link 106. For example, the transmitter 110 could encode information for transmission using the Multilevel Threshold-3 ("MLT3") protocol. Using this protocol, the transmitter 110 encodes information and produces an output signal having three different levels (+1, 0, and −1). Other encoding schemes could be used by the transmitter 110 without departing from the scope of this disclosure. The transmitter 110 includes any hardware, software, firmware, or combination thereof for transmitting information over a communication link 106.

The transformer 112 is coupled to the transmitter 110 and the communication link 106. The transformer 112 receives the encoded signal produced by the transmitter 110 and provides the encoded signal for transmission over the communication link 106. The transformer 112 represents any structure for coupling the transmitting device 102 to the communication link 106. As an example, the transformer 112 could couple the transmitting device 102 to an Ethernet cable.

The receiving device 104 is coupled to the communication link 106. The receiving device 104 receives information transmitted over the communication link 106 by the transmitting device 102. The receiving device 104 represents any device capable of communicating over the communication link 106. For example, the receiving device 104 could represent a computing device capable of communicating using the Ethernet protocol, such as a desktop computer, laptop computer, server computer, or other device. The receiving device 104 includes any hardware, software, firmware, or combination thereof for receiving information communicated over a communication link 106.

In the illustrated example, the receiving device 104 includes a transformer 114, a receiver 116, and a controller 118. The transformer 114 is coupled to the communication link 106 and the receiver 116. The transformer 114 receives the signal transmitted by the transmitting device 102 over the communication link 106 and provides the signal to the receiver 116. The transformer 114 represents any structure for coupling the receiving device 104 to the communication link 106. As an example, the transformer 114 could couple the receiving device 104 to an Ethernet cable.

The receiver 116 is coupled to the transformer 114 and the controller 118. The receiver 116 receives and decodes the signal transmitted by the transmitting device 102 over the communication link 106. The receiver 116 then provides the information contained in the decoded signal to the controller 118. The receiver 116 includes any hardware, software, firmware, or combination thereof for receiving information over a communication link 106.

The controller 118 is coupled to the receiver 116. The controller 118 is capable of receiving and processing the decoded information received over the communication link 106. For example, the controller 118 could represent a microprocessor, DSP, ASIC, or FPGA.

The communication link 106 couples the transmitting device 102 and the receiving device 104. The communication link 106 represents any communication link 106 capable of transferring information between the transmitting device 102 and the receiving device 104. For example, the communication link 106 could represent a twisted-pair cable, such as a category-5 ("cat-5") cable, capable of supporting communications using the Ethernet protocol.

In one aspect of operation, the signal transmitted by the transmitter 110 is distorted by various elements in the system 100 before reaching the receiver 116. For example, the signal may be altered by the transformer 112, the transformer 114, and/or the communication link 106. As particular examples, the transformers 112, 114 and/or the communication link 106 may cause cable attenuation, direct current ("DC") insertion loss, or other forms of distortion. This distortion may cause the signal received by the receiver 116 to be significantly different from the signal transmitted by the transmitter 110.

The amount of distortion may or may not remain constant in the system 100. If not constant, the distortion may vary over time and may vary from system to system. For example, the amount of distortion may vary based on the temperature of various components in the system 100. Also, the amount of distortion may vary based on process variations that occur during the production of various components in the system 100. In addition, the amount of distortion may vary based on the length of the communication link 106.

To help compensate for this distortion, the receiver 116 is capable of performing equalization. The equalization at least partially reduces the distortion caused during transmission. To implement the equalization, the receiver 116 includes a filter 120 having three stages 122-126. The filter 120 implements a transfer function that at least partially corrects for the distortion caused during transmission. In some embodiments, the filter 120 implements a transfer function having three adjustable zeros and one adjustable pole. The receiver 116 is capable of continuously adjusting the zeros and pole of the transfer function. This allows the operation of the filter 120 to be tuned to the conditions of a particular system 100 and/or to be tuned as conditions in the system 100 change. As a result, the receiver 116 implements "adaptive" equalization.

In some embodiments, the first stage 122 is capable of adjusting one of the zeros and the pole of the transfer function. In particular embodiments, the pole is higher in frequency than the zero controlled by the first stage 122. The second and third stages 124-126 are capable of adjusting the other two zeros of the transfer function.

In some embodiments, the number of stages 122-126 used to process the signals received over the communication link 106 is adjustable. One, some, or all of the stages 122-126 may be used to generate an output signal that is provided to the controller 118. For example, small amounts of distortion could be corrected using only the first stage 122. Additional amounts of distortion could be corrected using the first two stages 122-124. Even larger amounts of distortion could be corrected using all three stages 122-126.

By controlling the transfer function implemented using the stages 122-126 in the filter 120, the receiving device 104 may more effectively process signals transmitted over the communication link 106. For example, the receiving device 104 may remove larger amounts of distortion from the received signals. Also, the transmitting device 102 and the receiving device 104 may be able to communicate over longer communication links 106. As a particular example, the transmitting device 102 and the receiving device 104 could communicate over an Ethernet cable that is up to one hundred meters or more in length. In addition, the receiver 116 may perform equalization using a technique that has a simpler architecture than conventional equalization techniques, which may allow the receiver 116 to be implemented using less space.

Although FIG. 1 illustrates one example of a communication system 100, various changes may be made to FIG. 1. For example, other embodiments of the transmitting device 102 and/or the receiving device 104 could be used in the system 100. Also, the devices 102-104 have been labeled as "transmitting" and "receiving" for ease of illustration and explanation. One or both of the devices 102-104 could be capable of both transmitting and receiving information over the communication link 106. In addition, the filter 120 in the receiver 116 could include any number of stages.

Figure 2:
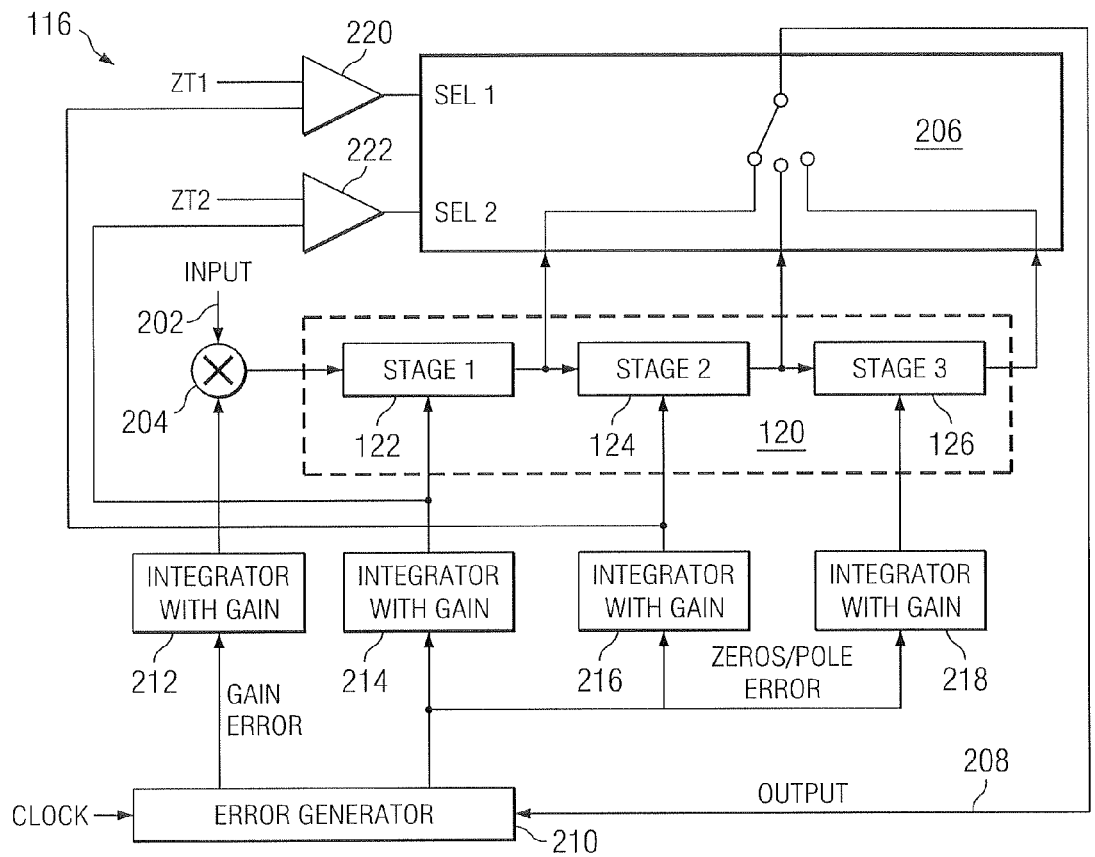
FIG. 2 illustrates an example receiver for performing adaptive equalization according to one embodiment of this disclosure.

FIG. 2 illustrates an example receiver 116 for performing adaptive equalization according to one embodiment of this disclosure. This embodiment of the receiver 116 is for illustration only. Other embodiments of the receiver 116 may be used without departing from the scope of this disclosure. Also, for ease of explanation, the receiver 116 is described as operating in the system 100 of FIG. 1. The receiver 116 could be used in any other suitable environment.

In the illustrated example, the receiver 116 includes the three stages 122-126 of the filter 120. The three stages 122-126 collectively implement a transfer function that at least partially corrects for transmission distortion. In some embodiments, each of the stages 122-126 also individually provides a transfer function. For example, the stages 122-126 could provide transfer functions of:

$$\text{Stage 1 Transfer Function: } \frac{1 + \frac{s}{z_1}}{1 + \frac{s}{p_1}} \quad (1)$$

$$\text{Stage 2 Transfer Function: } g_2 \cdot \left(1 + \frac{s}{z_2}\right) \quad (2)$$

$$\text{Stage 3 Transfer Function: } g_3 \cdot \left(1 + \frac{s}{z_3}\right) \quad (3)$$

where $z_1$, $z_2$, and $z_3$ represent the three zeros of the overall transfer function, $p_1$ represents the pole of the overall transfer function, $g_2$ represents the gain of the second stage 124, and $g_3$ represents the gain of the third stage 126. The order of the stages 122-126 in the filter 120 is for illustration only. In other embodiments, the stages 122-126 could be placed in a different order within the filter 120.

The receiver 116 is capable of receiving an input signal 202. The input signal 202 may, for example, represent the signal received over the communication link 106 and provided by the transformer 114. The input signal 202 is provided to a gain multiplier 204. The gain multiplier 204 is capable of receiving the input signal 202 and multiplying the input signal with a gain. The gain multiplier 204 is also capable of providing the input signal 202 to the filter 120. In some embodiments, the gain provided by the gain multiplier 204 is controllable or adjustable.

The first stage 122 of the filter 120 receives the input signal 202 from the gain multiplier 204 and processes the signal to produce an output. The output of the first stage 122 is provided to the second stage 124 and to a selector 206. The second stage 124 receives and processes the output from the first stage 122 to produce another output. The output of the second stage 124 is provided to the third stage 126 and to the selector 206. The third stage 126 receives and processes the output from the second stage 124 to produce yet another output. The output of the third stage 126 is provided to the selector 206.

The selector 206 receives the outputs from the three stages 122-126 of the filter 120. The selector 206 selects one of the outputs and provides the selected output as an output signal 208. The selected output from one of the stages 122-126 is provided to the controller 118 in the receiving device 104. The selector 206 includes any hardware, software, firmware, or combination thereof for selecting one of multiple signals. In this example, the selector 206 represents a three-way switch that is controlled by two inputs (SEL1 and SEL2), although other embodiments of the selector 206 could be used.

The output signal 208 produced by the selector 206 is provided to an error generator 210. The error generator 210 controls the three stages 122-126 of the filter 120 by adjusting the zeros and pole of the transfer function implemented by the stages 122-126. For example, the error generator 210 could generate error-correction pulses used to control the locations of the zeros and pole. The error generator 210 could also generate error-correction pulses used to control the gain provided by the gain multiplier 204. In some embodiments, the error generator 210 operates using a clock signal synchronized with the input signal 202. The error generator 210 includes any hardware, software, firmware, or combination thereof for controlling the pole and zeros of the filter 120.

The error-correction pulses generated by the error generator 210 are provided to four integrators 212-218. The integrators 212-218 integrate the pulses produced by the error generator 210. The integrated results are then provided to the gain multiplier 204 and the stages 122-126 of the filter 120. For example, the integrated results could represent currents used to set the gain of the gain multiplier 204 and the locations of the zeros and pole of the transfer function implemented by the filter 120. The integrators 212-218 may have an adjustable gain used to control the integration of the error-correction pulses. The integrators 212-218 represent any hardware, software, firmware, or combination thereof for integrating error-correction pulses.

Two comparators 220-222 receive the integrated results produced by two of the integrators 214-216. The comparators 220-222 also receive two different thresholds referred to as "zero thresholds" (ZT1 and ZT2). The comparators 220-222 produce outputs based on comparisons between the two integrated results produced by the integrators 214-216 and the thresholds. The outputs produced by the comparators 220-222 are provided to the selector 206 as the SEL1 and SEL2 inputs. Based on the values produced by the comparators 220-222, the selector 206 selects the output from one of the stages 122-126 as the output signal 208. In this way, the comparators 220-222 control the number of stages 122-126 used by the filter 120 to produce the output signal 208.

In one aspect of operation, the gain multiplier 204 provides a gain to the input signal 202, and the stages 122-126 process the input signal 202. The output of one of the stages 122-126 is selected by the selector 206 as the output signal 208. The output signal 208 is then analyzed by the error generator 210, which uses the characteristics of the output signal 208 to adjust the gain of the gain multiplier 204 and to adjust the zeros and pole of the transfer function implemented by the stages 122-126. The signals produced by the error generator 210 are also used by the comparators 220-222 to control the operation of the selector 206. In this way, the receiver 116 implements an equalization technique that corrects for distortion caused during transmission of a signal. Also, the equalization technique is adaptive in that the equalization varies as needed.

The various components 204-206, 210-222 shown in FIG. 2 could be implemented in any suitable manner. For example, the components 204-206, 210-222 could be implemented as part of the controller 118 in the receiving device 104. The components 204-206, 210-222 could also be implemented in a separate controller within the receiver 116 or within the filter 120. In addition, the receiver 116 could be constructed using any suitable technology, such as Complementary Metal Oxide Semiconductor ("CMOS") technology.

Although FIG. 2 illustrates one example of a receiver 116 for performing adaptive equalization, various changes may be made to FIG. 2. For example, the receiver 116 could use a filter 120 having any number of stages 122-126. Also, the receiver 116 could use any other technique to select the output from one of the stages 122-126 as the output signal 208 of the receiver 116.

Figure 3:
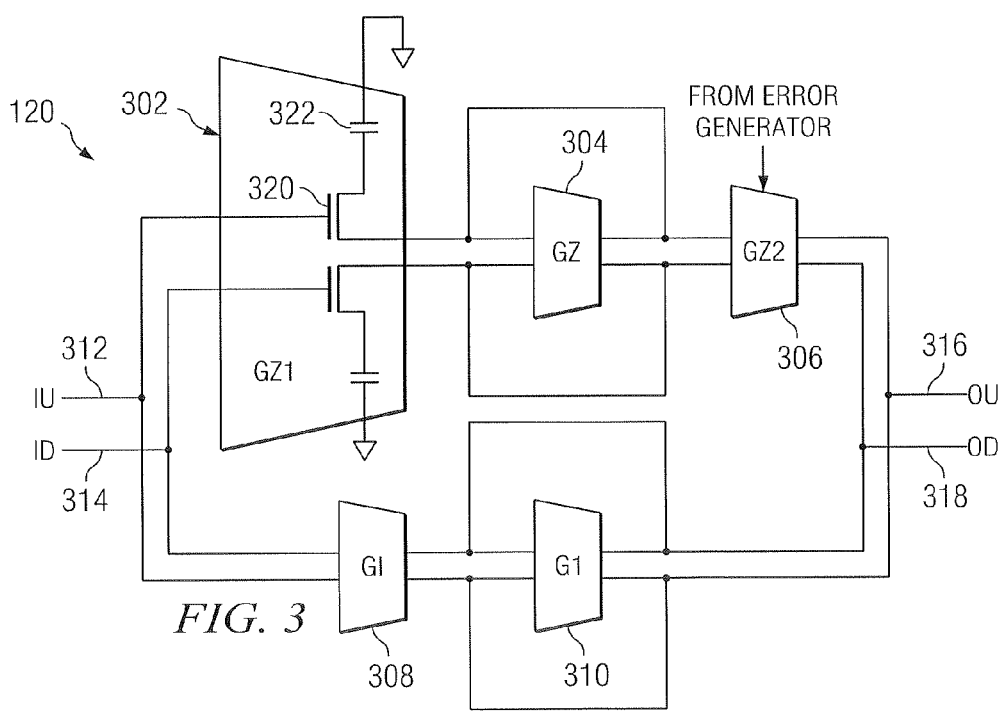
FIG. 3 illustrates an example first stage of a receiver filter according to one embodiment of this disclosure.

FIG. 3 illustrates an example first stage 122 of a receiver filter 120 according to one embodiment of this disclosure. This embodiment of the first stage 122 is for illustration only. Other embodiments of the first stage 122 may be used without departing from the scope of this disclosure. Also, for ease of explanation, the first stage 122 is described as operating in the system 100 of FIG. 1. The first stage 122 could be used in any other suitable environment.

In this example, the first stage 122 is implemented using differential elements 302-310. Each of the differential elements 302-310 is capable of receiving two input signals and generating two output signals. In this document, the term "each" refers to every of at least a subset of the identified items. Each of the differential elements 302-310 could represent any suitable differential structure, such as one or more transistors or operational amplifiers ("op-amps").

The differential elements 302 and 308 receive two input signals 312-314, and the differential elements 306 and 310 generate two output signals 316-318. The two input signals 312-314 could represent inputs from the gain multiplier 204 of FIG. 2. The two output signals 316-318 could represent outputs provided to the second stage 124 of the filter 120. The differential element 306 is controlled by the error generator 210 and the integrator 214. This may allow, for example, the location of the pole and one of the zeros to be controlled by the differential element 306.

In this example, the differential element 302 is represented as two transistors 320 and two capacitors 322. The transistors 320 have a transconductance (gm), and the capacitors 322 have a capacitance (C). For this reason, the first stage 122 may be described as implementing a gm-C differential structure.

The first stage 122 shown in FIG. 3 may provide the following transfer function:

$$H(s) = \frac{g_i}{g_1} \cdot \frac{1 + sC((g_i \cdot g_z + g_{z1} \cdot g_{z2})/(g_z \cdot g_{z1} \cdot g_i))}{1 + sC/g_{z1}} \quad (4)$$

where C represents the capacitance of the capacitors 322, and $g_{z1}$, $g_z$, $g_{z2}$, $g_i$, and $g_1$ represent the transconductances of transistors in the differential elements 302-310, respectively.

Although FIG. 3 illustrates one example of a first stage 122 of a receiver filter 120, various changes may be made to FIG. 3. For example, the differential element 306 could receive multiple signals from the error generator 210, such as when one signal controls the location of a zero and another signal controls the location of a pole.

Figure 4:
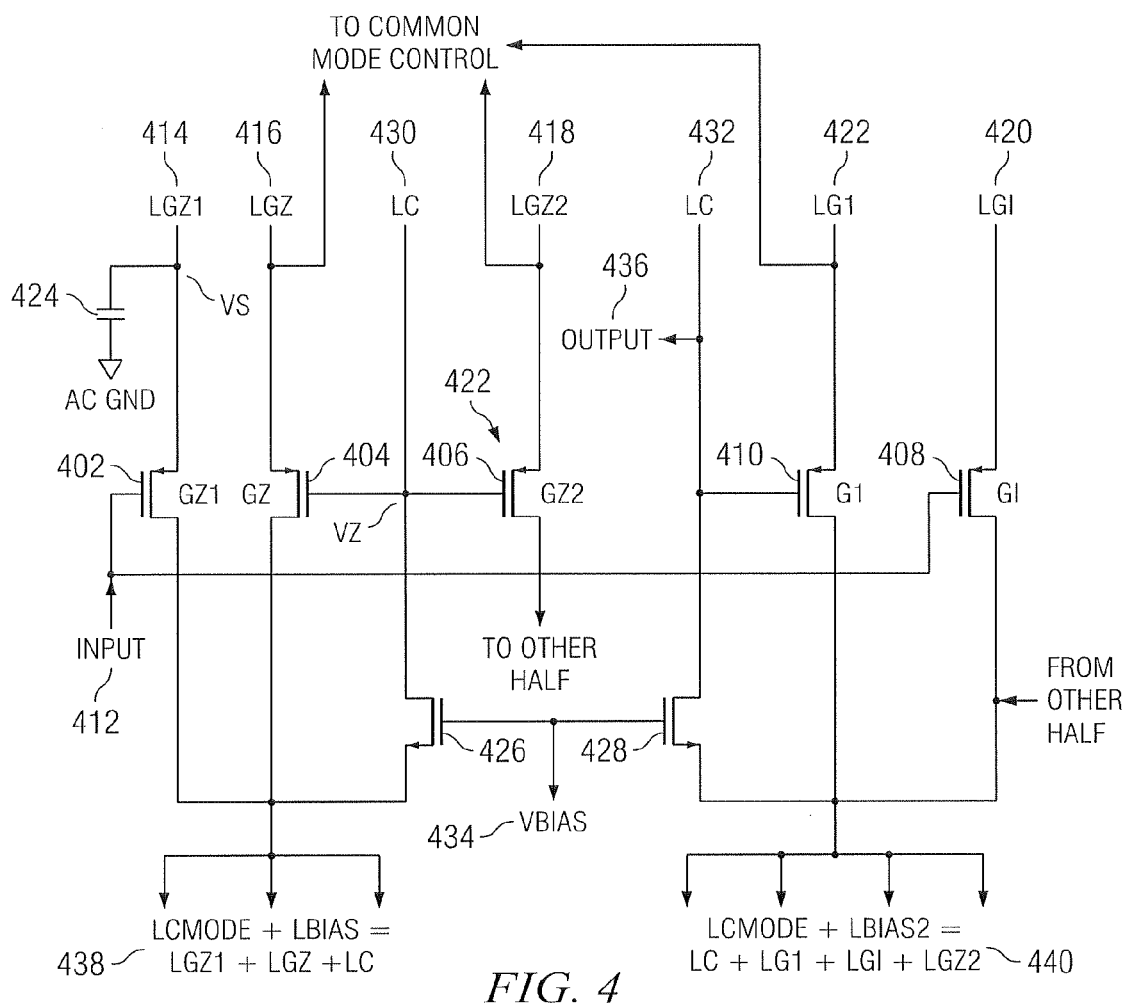
FIG. 4 illustrates additional details of an example first stage of a receiver filter according to one embodiment of this disclosure.

FIG. 4 illustrates additional details of an example first stage 122 of a receiver filter 120 according to one embodiment of this disclosure. This embodiment of the first stage 122 is for illustration only. Other embodiments of the first stage 122 may be used without departing from the scope of this disclosure. Also, for ease of explanation, the first stage 122 is described as operating in the system 100 of FIG. 1. The first stage 122 could be used in any other suitable environment.

The embodiment shown in FIG. 4 represents the implementation of a portion of the first stage 122 shown in FIG. 3. In particular, the embodiment shown in FIG. 4 represents one half of the implementation of the first stage 122 shown in FIG. 3. The other half of the implementation of the first stage 122 may represent a mirror-image of the circuitry shown in FIG. 4.

As shown in FIG. 4, the illustrated portion of the first stage 122 includes five transistors 402-410. The transistors 402-410 implement a portion of the differential elements 302-310, respectively, from FIG. 3. For example, the transistor 402 could represent one of the transistors 320 in the differential element 302 of FIG. 3. The other transistor 320 in the differential element 302 of FIG. 3 would be implemented in the mirror-image of the circuitry of FIG. 4. The transistors 402-410 represent any suitable transistors. For example, the transistors 402-410 could represent p-type transistors.

Each of the transistors 402, 408 receives an input signal 412. For example, the input signal 412 could represent one of the differential inputs 312-314 received by the first stage 122 in FIG. 3. The other of the differential inputs 312-314 would be received by transistors in the other half of the first stage 122.

In this example, the transistors 402-410 also receive various bias currents 414-422. The bias currents 414-422 may be generated in any suitable manner. For example, the bias currents 414-422 could be generated by one or more current generators. The bias currents 414-422 are provided to sources of the various transistors 402-410. Three of the bias currents 416, 418, and 422 are also coupled to a common mode voltage controller. In addition, the bias current 414 is coupled to a capacitor 424. The capacitor 424 could, for example, represent one of the capacitors 322 from the differential element 302 of FIG. 3.

As shown in FIG. 4, the illustrated portion of the first stage 122 includes two additional transistors 426-428. The transistors 426-428 are coupled to bias currents 430-432. The gates of the transistors 426-428 are coupled to a bias voltage 434. The transistors 426-428 could represent any suitable transistors. For example, the transistors 426-428 could represent n-type transistors.

In this example, an output 436 of the illustrated portion of the first stage 122 is coupled to the bias current 432, a gate of the transistor 410, and a drain of the transistor 428. The output 436 of the illustrated portion of the first stage 122 may represent, for example, one of the differential outputs 316-318 shown in FIG. 3. The other of the differential outputs 316-318 would be produced in a similar manner by the other half of the first stage 122.

As shown in FIG. 4, the first stage 122 also produces various currents 438-440. In this example, the current 438 represents a combination of the bias currents 414-416, 430 that are provided to the transistors 402-404, 426. Similarly, the current 440 represents a combination of the bias currents 418-422, 432 that are provided to the transistors 406-410, 428.

As described above, the portion of the first stage 122 shown in FIG. 4 may represent half of the first stage 122. The other half of the first stage 122 could be implemented as a mirror-image of the circuitry shown in FIG. 4. In this example, the illustrated half would receive one of the two input signals 312-314 and produce one of the two output signals 316-318. The mirror-image half of the first stage 122 would receive the other of the input signals 312-314 and produce the other of the output signals 316-318. As shown in FIG. 4, the drain of the transistor 406 would be coupled to the corresponding point in the mirror-image circuit. Also, the drain of the transistor 408 would be coupled to the corresponding point in the mirror-image circuit.

In this example, the operation of the first stage 122 may be defined using the equations:

$$I_{g_{z1}} = g_{z1} \cdot V_{gs} = g_{z1} \cdot (V_g - V_s) = g_{z1} \cdot (V_{in} - V_s) \quad (5)$$

$$V_s = I_{g_{z1}} \cdot \frac{1}{sC} \quad (6)$$

$$I_{g_{z1}} = g_{z1} \cdot \left(V_{in} - I_{g_{z1}} \cdot \frac{1}{sC}\right) \quad (7)$$

$$I_{g_{z1}} = g_{z1} \cdot V_{in} \cdot \frac{1}{\left(1 + \frac{g_{z1}}{sC}\right)} \quad (8)$$

$$V_z = I_{g_{z1}} \cdot \frac{1}{g_z} \quad (9)$$

$$I_{g_{z2}} = V_z \cdot g_{z2} = \frac{g_{z2}}{g_z} \cdot \left(\frac{g_{z1} \cdot V_{in}}{1 + \frac{g_{z1}}{sC}}\right) \quad (10)$$

$$I_{g_i} = V_{in} \cdot g_i \quad (11)$$

$$V_{out} = (I_{g_i} + I_{g_{z2}}) \cdot \frac{1}{g_1}$$

where $V_{gs}$ represents the gate-source voltage of the transistor 402, $V_g$ represents the gate voltage of the transistor 402, $V_s$ represents the source voltage of the transistor 402, $V_{in}$ represents the voltage of the input signal 412, C represents the capacitance of the capacitor 424, $V_z$ represents the voltage at the gates of the transistors 404-406, and $V_{out}$ represents the voltage of the output signal 436. These equations may be used to obtain the transfer function as shown above in equation (4).

If values for $g_i$ and $g_1$ are equal, a unity gain may be achieved. Also, in the transfer function of equation (4), the zero is located at:

$$\frac{(g_z \cdot g_{z1} \cdot g_i)}{C \cdot (g_i \cdot g_z + g_{z1} \cdot g_{z2})} = \frac{1}{C \cdot \left(\frac{1}{g_{z1}} + \frac{g_{z2}}{g_z \cdot g_i}\right)} \quad (12)$$

and the pole is located at:

$$\frac{g_{z1}}{C} = \frac{1}{C \cdot \left(\frac{1}{g_{z1}}\right)}. \quad (13)$$

From equations (12) and (13), the zero has a lower frequency than the pole. By varying the bias currents 414 and 418, the transconductances of the transistors 402 and 406 can be varied. This allows the locations of the pole and zero to be adjusted. As explained above, the error generator 210 could generate the signals needed to adjust the locations of the pole and zero.

Although FIG. 4 illustrates additional details of one example of a first stage 122 of a receiver filter 120, various changes may be made to FIG. 4. For example, other embodiments of the first stage 122 may be used in the receiver 116.

Figure 5:
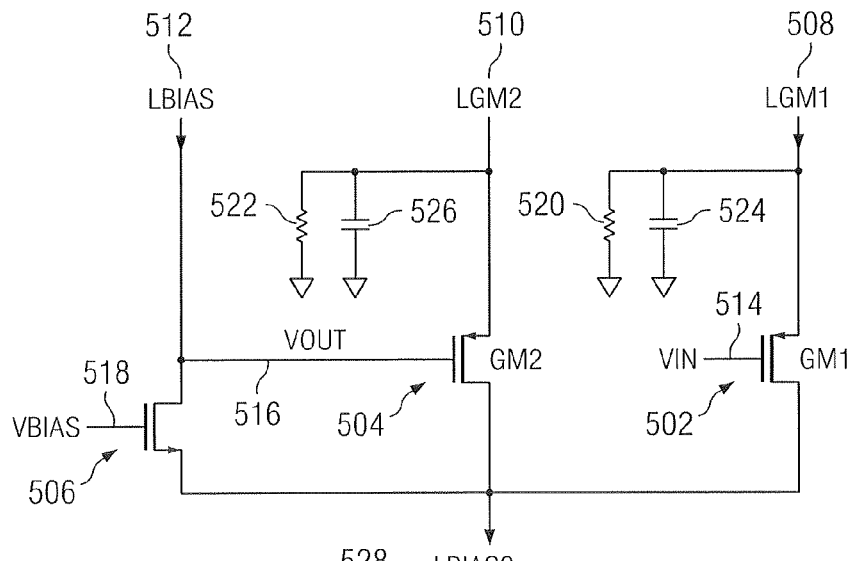
FIG. 5 illustrates an example second stage or third stage of a receiver filter according to one embodiment of this disclosure.

FIG. 5 illustrates an example second stage 124 or third stage 126 of a receiver filter 120 according to one embodiment of this disclosure. This embodiment of the second or third stage 124, 126 is for illustration only. Other embodiments of the second or third stage 124, 126 may be used without departing from the scope of this disclosure. Also, for ease of explanation, the second or third stage 124, 126 is described as operating in the system 100 of FIG. 1. The second or third stage 124, 126 could be used in any other suitable environment.

As described above, the first stage 122 is capable of controlling the locations of a pole and a first zero of the filter's transfer function. The second stage 124 and the third stage 126 may be capable of controlling second and third zeros of the transfer function. In some embodiments, the second stage 124 and the third stage 126 have poles that are not adjustable. In particular embodiments, the poles of the second and third stages 124, 126 are set to one or more out-of-band high frequencies that do not significantly affect the transfer function.

The embodiment shown in FIG. 5 represents the implementation of a portion of the second stage 124 or the third stage 126. In particular, the embodiment shown in FIG. 5 represents one half of the implementation of the second or third stage 124, 126. The other half of the second or third stage 124, 126 may represent a mirror-image of the circuitry shown in FIG. 5. The second and third stages 124, 126 may have similar or identical layouts.

As shown in FIG. 5, the illustrated portion of the second or third stage 124, 126 includes three transistors 502-506. The transistors 502-506 may represent any suitable transistors. For example, the transistors 502-504 could represent p-type transistors, and the transistor 506 could represent an n-type transistor. The transistors 502-506 receive bias currents 508-512, respectively. The bias currents 508-512 may be generated in any suitable manner, such as by one or more current generators.

The gates of the transistors 502-506 receive voltages 514-518, respectively. The voltage 514 represents the voltage of an input signal. For example, if the circuit in FIG. 5 represents the second stage 124, the input signal could represent the output produced by the first stage 122. If the circuit in FIG. 5 represents the third stage 126, the input signal could represent the output produced by the second stage 124. The voltage 516 represents the voltage of the output produced by the second or third stage 124, 126. The voltage 518 represents a suitable bias voltage.

The second or third stage 124, 126 also includes a first resistor 520, a second resistor 522, a first capacitor 524, and a second capacitor 526. The resistors 520-522 could have any suitable resistance(s), and the capacitors 524-526 could have any suitable capacitance(s).

As shown in FIG. 5, the illustrated portion of the second or third stage 124, 126 is biased by a current 528. In this example, the current 528 represents a combination of the bias currents 508-512 that are provided to the transistors 502-506.

The operation of the second or third stages 124, 126 could be defined using the following equations:

$$V_{out} = V_{gs2} + I \cdot \left(\frac{R_2}{1 + sR_2C_2}\right) \quad (14)$$

$$V_{out} = \frac{I}{gm_2} + I \cdot \left(\frac{R_2}{1 + sR_2C_2}\right) = I \cdot \left(\frac{1}{gm_2} + \left(\frac{R_2}{1 + sR_2C_2}\right)\right) \quad (15)$$

where $V_{gs2}$ represents the gate-source voltage of the transistor 504, $R_2$ represents the resistance of the resistor 522, $C_2$ represents the capacitance of the capacitor 526, $gm_2$ represents the transconductance of the transistor 504, and I represents the current flowing into the source of the transistor 504.

In this example, the current I may be the same for both of the transistors 502-504. Based on this, the following equations may be defined:

$$I = gm_1 \cdot V_{gs1} = gm_1 \cdot (V_{in} - V_{s1}) = gm_1 \cdot \left(V_{in} - I \cdot \left(\frac{R_1}{1 + sR_1C_1}\right)\right) \quad (16)$$

$$I \cdot \left(1 + gm_1 \cdot \left(\frac{R_1}{1 + sR_1C_1}\right)\right) = gm_1 \cdot V_{in} \quad (17)$$

$$I = \frac{gm_1 \cdot V_{in}}{1 + gm_1 \cdot \left(\frac{R_1}{1 + sR_1C_1}\right)} \quad (18)$$

$$V_{out} = I \cdot \left(\frac{1}{gm_2} + \frac{R_2}{1 + sR_2C_2}\right) = \quad (19)$$

$$\frac{gm_1 \cdot V_{in}}{1 + gm_1 \cdot \left(\frac{R_1}{1 + sR_1C_1}\right)} \cdot \left(\frac{1}{gm_2} + \frac{R_2}{1 + sR_2C_2}\right)$$

where $V_{gs1}$ represents the gate-source voltage of the transistor 502, $R_1$ represents the resistance of the resistor 520, $C_1$ represents the capacitance of the capacitor 524, $gm_1$ represents the transconductance of the transistor 502, and $V_{s1}$ represents the voltage at the source of the transistor 502.

Simplifying equation (19) produces the following transfer function:

$$V_{out} = \frac{gm_1}{gm_2} \cdot \left(\frac{gm_2R_2 + 1}{gm_1R_1 + 1}\right) \cdot \left(\frac{1 + sR_1C_1}{1 + sR_2C_2}\right) \cdot \left(\frac{1 + \frac{sR_2C_2}{gm_2R_2 + 1}}{1 + \frac{sR_1C_1}{gm_1R_1 + 1}}\right). \quad (20)$$

The last portion of equation (20) could be ignored as $(gm_2R_2+1)$ and $(gm_1R_1+1)$ cause a pole and a zero to occur at a low frequency that is out of the range of interest. This allows equation (20) to be simplified as follows:

$$V_{out} = \frac{gm_1}{gm_2} \cdot \left(\frac{gm_2R_2 + 1}{gm_1R_1 + 1}\right) \cdot \left(\frac{1 + sR_1C_1}{1 + sR_2C_2}\right). \quad (21)$$

If values for $R_2$ and $C_2$ are fixed, the location of the pole is fixed. The location of the zero may be adjusted by varying the value of $R_1$. However, varying the value of $R_1$ may also vary the gain due to the term $(gm_1R_1+1)$ in the denominator of equation (21). If a multiplication factor is introduced into equation (21), the value of $R_1$ may be adjusted to move the location of the zero while reducing or eliminating variations to the gain. The introduction of the multiplication factor adjusts equation (21) as follows:

$$V'_{out} = \frac{gm_1}{gm_2} \cdot \left(\frac{gm_2R_2 + 1}{gm_1R_1 + 1}\right) \cdot \left(\frac{1 + sR_1C_1}{1 + sR_2C_2}\right) \cdot (gm_1R_1 + 1). \quad (22)$$

This equation can then be rewritten as:

$$V'_{out} = \frac{gm_1}{gm_2} \cdot (gm_2R_2 + 1) \cdot \left(\frac{1 + sR_1C_1}{1 + sR_2C_2}\right). \quad (23)$$

The multiplication factor introduced into equation (22) may be provided by a gain circuit in the second or third stage 124, 126 of the filter 120. One example of a gain circuit in the second or third stage 124, 126 is shown in FIG. 6, which is described below.

Although FIG. 5 illustrates one example of a second stage 124 or third stage 126 of a receiver filter 120, various changes may be made to FIG. 5. For example, other embodiments of the second stage 124 and/or the third stage 126 may be used in the receiver 116.

Figure 6:
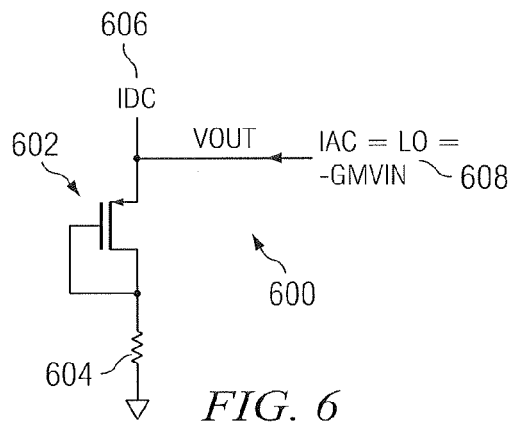
FIG. 6 illustrates an example gain circuit of a second stage or third stage of a receiver filter according to one embodiment of this disclosure.

FIG. 6 illustrates an example gain circuit 600 of a second stage 124 or third stage 126 of a receiver filter 120 according to one embodiment of this disclosure. This embodiment of the gain circuit 600 is for illustration only. Other embodiments of the gain circuit 600 may be used without departing from the scope of this disclosure. Also, for ease of explanation, the gain circuit 600 is described as operating in conjunction with the implementation of the second or third stage 124, 126 shown in FIG. 5. The gain circuit 600 could be used in any other suitable environment.

The embodiment shown in FIG. 6 represents the implementation of a portion of the gain circuit 600 used in conjunction with the second or third stage 124, 126. In particular, the embodiment shown in FIG. 6 represents one half of the implementation providing the multiplication factor described above with respect to equations (22) and (23). The other half of the gain circuit 600 may represent a mirror-image of the circuitry shown in FIG. 6.

In this example, the portion of the gain circuit 600 includes a transistor 602 and a resistor 604. The transistor 602 may represent any suitable transistor, such as a p-type transistor. Also, the resistor 604 may have any suitable resistance, such as a resistance of $R_1$ (the resistance of resistor 520 of FIG. 5).

In this example, the source of the transistor 602 receives two currents 606-608. The current 606 may represent a bias current, such as a current from a current generator. The current 608 may represent a current used to control the gain provided by the gain circuit 600.

The operation of the gain circuit 600 may be defined using the following equation:

$$V_{out} = -gm \cdot V_{gs} \cdot R_1 - V_{gs} = -V_{gs} \cdot (gm \cdot R_1 + 1) \quad (24)$$

where gm represents the transconductance of the transistor 602, $V_{gs}$ represents the gate-source voltage of the transistor 602, and $R_1$ represents the resistance of the resistor 604. Since $V_{out} = V_s$ (the source voltage of the transistor 602) in FIG. 6, equation (24) may be rewritten as:

$$V_{out} = -V_g \cdot (gm \cdot R_1 + 1) + V_{out} \cdot (gm \cdot R_1 + 1) \quad (25)$$

where $V_g$ represents the gate voltage of the transistor 602. Since $V_g = I_o R_1 = -gm V_{in} R_1$, equation (25) may be rewritten as:

$$\frac{V_{out}}{V_{in}} = (gm \cdot R_1 + 1). \quad (26)$$

Based on this, the gain circuit 600 may be used in the overall transfer function of the second or third stage 124, 126. By varying $R_1$ and keeping $C_1$, $C_2$, $R_2$, $gm_1$, and $gm_2$ fixed, the location of a zero can be adjusted by the second or third stage 124, 126 without significantly affecting the gain of the second or third stage 124, 126.

Although FIG. 6 illustrates one example of a gain circuit 600 of a second stage 124 or third stage 126 of a receiver filter 120, various changes may be made to FIG. 6. For example, other embodiments of the gain circuit 600 may be used in the second stage 124 and/or the third stage 126 in the receiver 116. Also, other mechanisms may be used to provide the multiplication factor introduced into equation (22).

Figure 7:
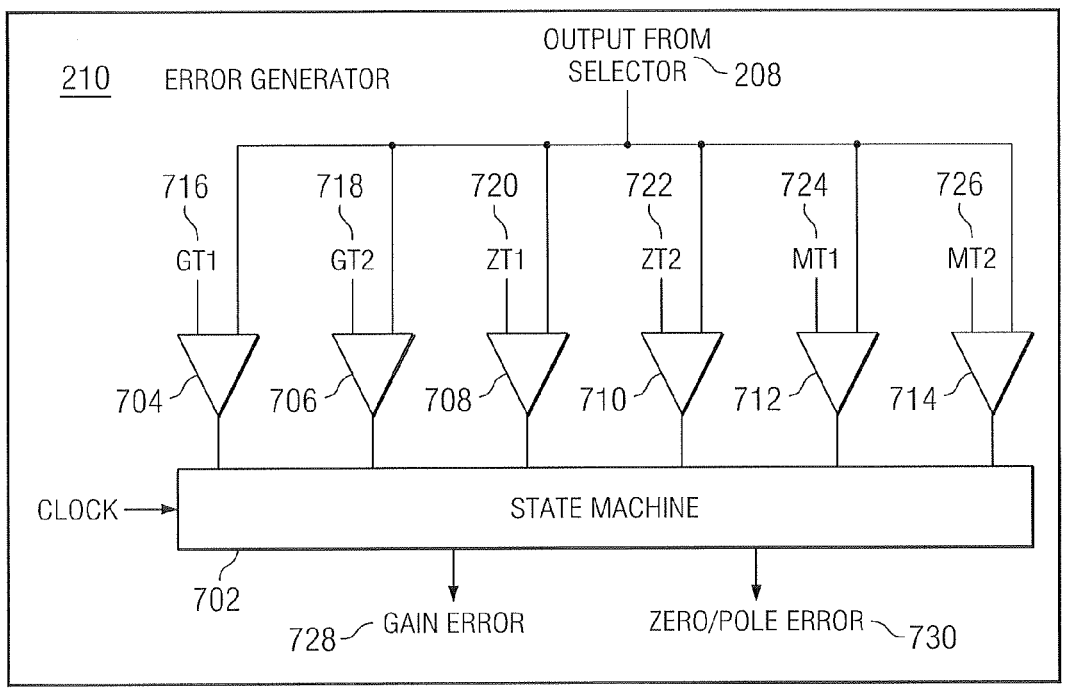
FIG. 7 illustrates an example error generator in a receiver according to one embodiment of this disclosure.

FIG. 7 illustrates an example error generator 210 in a receiver 116 according to one embodiment of this disclosure. This embodiment of the error generator 210 is for illustration only. Other embodiments of the error generator 210 may be used without departing from the scope of this disclosure. Also, for ease of explanation, the error generator 210 is described as operating in the system 100 of FIG. 1. The error generator 210 could be used in any other suitable environment.

In this example, the error generator 210 includes a state machine 702 and six comparators 704-714. The comparators 704-714 are capable of receiving the output signal 208 provided by the selector 206 of FIG. 2. The comparators 704-714 are also capable of receiving threshold voltages 716-726, respectively.

The state machine 702 uses the outputs of the comparators 704-714 to generate error-correction pulses that are used to adjust the operation of the receiver 116 of FIG. 2. For example, the state machine 702 may generate gain error-correction pulses 728 to adjust the gain of the gain multiplier 204 in FIG. 2. Also, the state machine 702 may generate zero/pole error-correction pulses 730 to adjust the locations of the zeros and pole of the transfer function provided by the stages 122-126 in the filter 120 of FIG. 2. In particular embodiments, the same error-correction pulses 730 are used to adjust the zero and the pole of the first stage 122, but the gain of the integrator 214 may be different for adjusting the pole and for adjusting the zero.

As a specific example, the state machine 702 may operate in one of four different states in addition to an initial state. The state machine 702 transitions between the various states to generate the gain correction pulses 728 and to generate the zero/pole correction pulses 730. In particular embodiments, the gain correction pulses 728 are only generated when the output signal 208 maintains a pulse for three or more clock periods (although different lengths could be used). This helps to ensure that the output signal 208 has stabilized before the gain measurement is performed. In general, pulses of three or more clock periods may be common in the output signal 208.

The state machine 702 includes any hardware, software, firmware, or combination thereof for controlling the operation of the receiver 116. For example, the state machine 702 could represent a processor and associated software or firmware instructions. Also, the comparators 704-714 could represent any hardware, software, firmware, or combination thereof for comparing two inputs.

In this example, the comparators 704-706 receive gain thresholds (GT1 and GT2) 716-718. One of the gain thresholds 716-718 could represent a positive voltage, and the other of the gain thresholds 716-718 could represent a negative voltage. As a particular example, the gain thresholds 716-718 could represent +0.55V and −0.55V, respectively. The gain thresholds 716-718 are used to determine whether the output signal 208 has a suitable gain and to adjust the gain of the gain multiplier 204.

The comparators 708-710 receive zero thresholds (ZT1 and ZT2) 720-722. One of the zero thresholds 720-722 could represent a positive voltage, and the other of the zero thresholds 720-722 could represent a negative voltage so that both positive and negative peaks may be detected. As a particular example, the zero thresholds 720-722 could represent +0.50V and −0.50V, respectively. The zero thresholds 720-722 are used to determine whether to adjust the zeros and pole of the transfer function provided by the filter 120. The zero thresholds 720-722 could, for example, represent the same thresholds as the thresholds used by the comparators 220-222 of FIG. 2.

In addition, the comparators 712-714 receive main thresholds (MT1 and MT2) 724-726. One of the main thresholds 724-726 could represent a positive voltage, and the other of the main thresholds 724-726 could represent a negative voltage so that both positive and negative peaks may be detected. As a particular example, the main thresholds 724-726 could represent +0.10V and −0.10V, respectively. The main thresholds 724-726 are used to determine if the output signal 208 is a valid signal. This may allow, for example, the error generator 210 to identify valid MLT3 signals.

In some embodiments, the comparators 704-714 operate using hysteresis. The hysteresis defines a window or range of values centered on the thresholds 716-726. For example, the window or range could represent ±0.005 volts. As a particular example, the window for the comparator 704 could equal 0.545V through 0.555V, the window for the comparator 708 could equal 0.495V through 0.505V, and the window for the comparator 712 could equal 0.095 through 0.105V. The windows for the comparators 706, 710, 714 could represent the corresponding negative voltages.

In these embodiments, the comparators 704-714 may each produce a two-bit output value indicating whether the output signal 208 is below, within, or outside the window of voltages centered at one of the thresholds 716-726. For example, the comparator 704 could output a value of "11" if the output signal 208 exceeds 0.555V (gain is too high), a value of "00" if the output signal 208 is between 0.545V and 0.555V (gain is acceptable), and a value of "01" if the output signal 208 is below 0.545V (gain is too low). Similar values could be output by the other comparators 706-714 based on their associated range of voltages.

In this way, the state machine 702 may receive information indicating whether the gain for the output signal 208 is acceptable, whether one or more of the zeros and/or the pole of the transfer function must be adjusted, and whether the output signal 208 represents a valid signal. The state machine 702 may then generate error-correction pulses 728-730 as needed.

Although FIG. 7 illustrates one example of an error generator 210 in a receiver 116, various changes may be made to FIG. 7. For example, any number of comparators 704-714 and thresholds 716-726 may be used in the error generator 210. Also, other embodiments of the error generator 210 may be used in the receiver 116.

Figure 8:
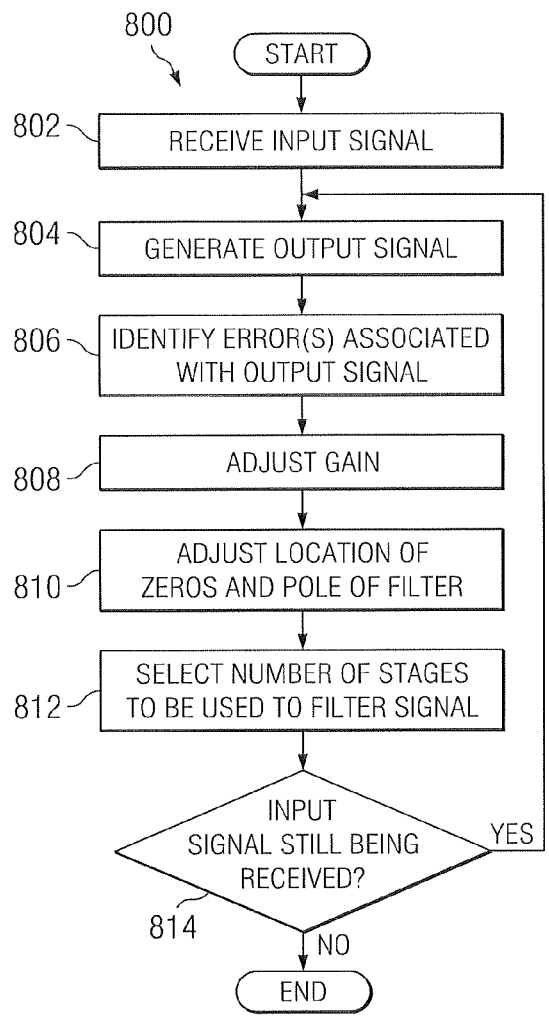
FIG. 8 illustrates an example method for performing adaptive equalization according to one embodiment of this disclosure.

FIG. 8 illustrates an example method 800 for performing adaptive equalization according to one embodiment of this disclosure. For ease of explanation, the method 800 is described with respect to the receiver 116 of FIG. 2 operating in the system 100 of FIG. 1. The method 800 could be used by any other device and in any other system.

The receiver 116 receives an input signal at step 802. This may include, for example, the receiving device 104 receiving a signal over the communication link 106. This may also include the transformer 114 providing an input signal 202 to the receiver 116.

The receiver 116 begins generating an output signal using the input signal at step 804. This may include, for example, the receiver 116 applying a gain to the input signal 202 using the gain multiplier 204. This may also include the receiver 116 processing the input signal 202 using one or more stages 122-126 of the filter 120 to produce an output signal 208. By default, the receiver 116 could initially process the input signal 202 using one, some, or all of the stages 122-126 of the filter 120.

The receiver 116 identifies one or more errors associated with the generated output signal at step 806. This may include, for example, the error generator 210 receiving the output signal 208. This may also include the error generator 210 generating gain error-correction pulses 728 when the gain is too high or too low. This may also include the error generator 210 generating zero/pole error-correction pulses 730 when the pole or zeros of the transfer function provided by the filter 120 need to be adjusted.

The receiver 116 adjusts the gain applied to the input signal at step 808. This may include, for example, the error generator 210 providing the gain error-correction pulses 728 to the integrator 212. This may also include the integrator 212 integrating the error-correction pulses 728 and providing the integrated results to the gain multiplier 204.

The receiver 116 adjusts the location of one or more of the zeros and/or the pole of the filter's transfer function at step 810. This may include, for example, the error generator 210 providing the zero/pole error-correction pulses 730 to the integrators 214-218. This may also include the integrators 214-218 integrating the error-correction pulses 730 and providing the integrated results to the stages 122-126 of the filter 120.

The receiver 116 selects the number of stages in the filter 120 to be used to process the incoming signal at step 812. This may include, for example, the comparators 220-222 receiving the integrated results produced by the integrators 214-216. This may also include the comparators 220-222 comparing the integrated results from the integrators 214-216 with the zero thresholds. In addition, this may include the comparators 220-222 producing outputs based on the comparisons. The selector 206 uses the outputs from the comparators 220-222 to select the output of one of the stages 122-126 as the output signal 208.

If the receiver 116 continues to receive the input signal at step 814, the receiver 116 returns to step 804 to continue generating the output signal 208. At this point, the receiver 116 uses the selected number of stages, the identified gain, and the identified zeros and pole to process the input signal 202. The receiver 116 then repeats the process and adjusts the gain, zeros, pole, and/or number of stages as needed.

Although FIG. 8 illustrates one example of a method 800 for performing adaptive equalization, various changes may be made to FIG. 8. For example, the receiver 116 could select the number of stages and adjust the zeros, pole, and gain in any other suitable manner.

Figure 9C:
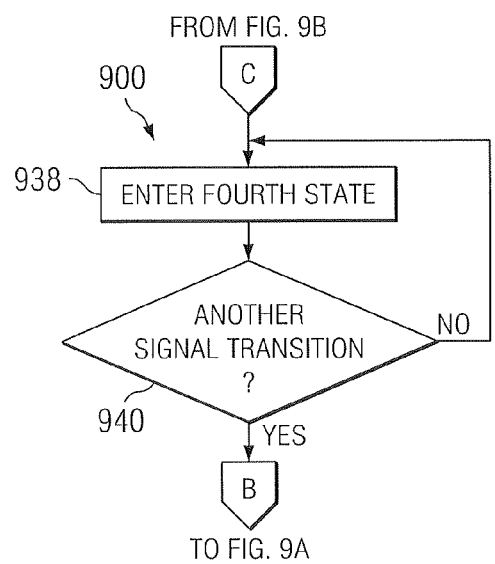
FIGS. 9A through 9C illustrate an example method for adjusting a receiver filter according to one embodiment of this disclosure.
Figure 9A:
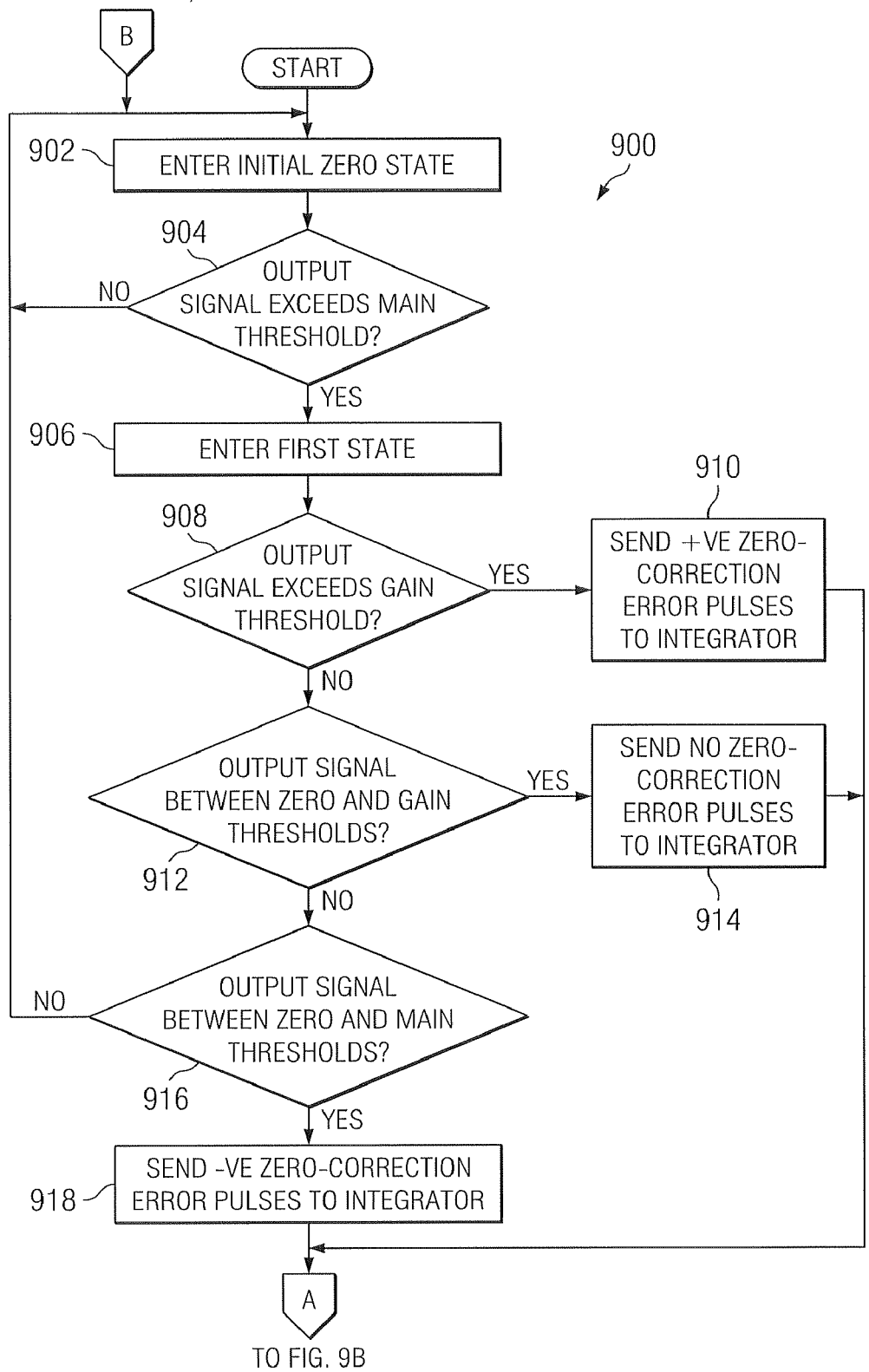
Figure 9B:
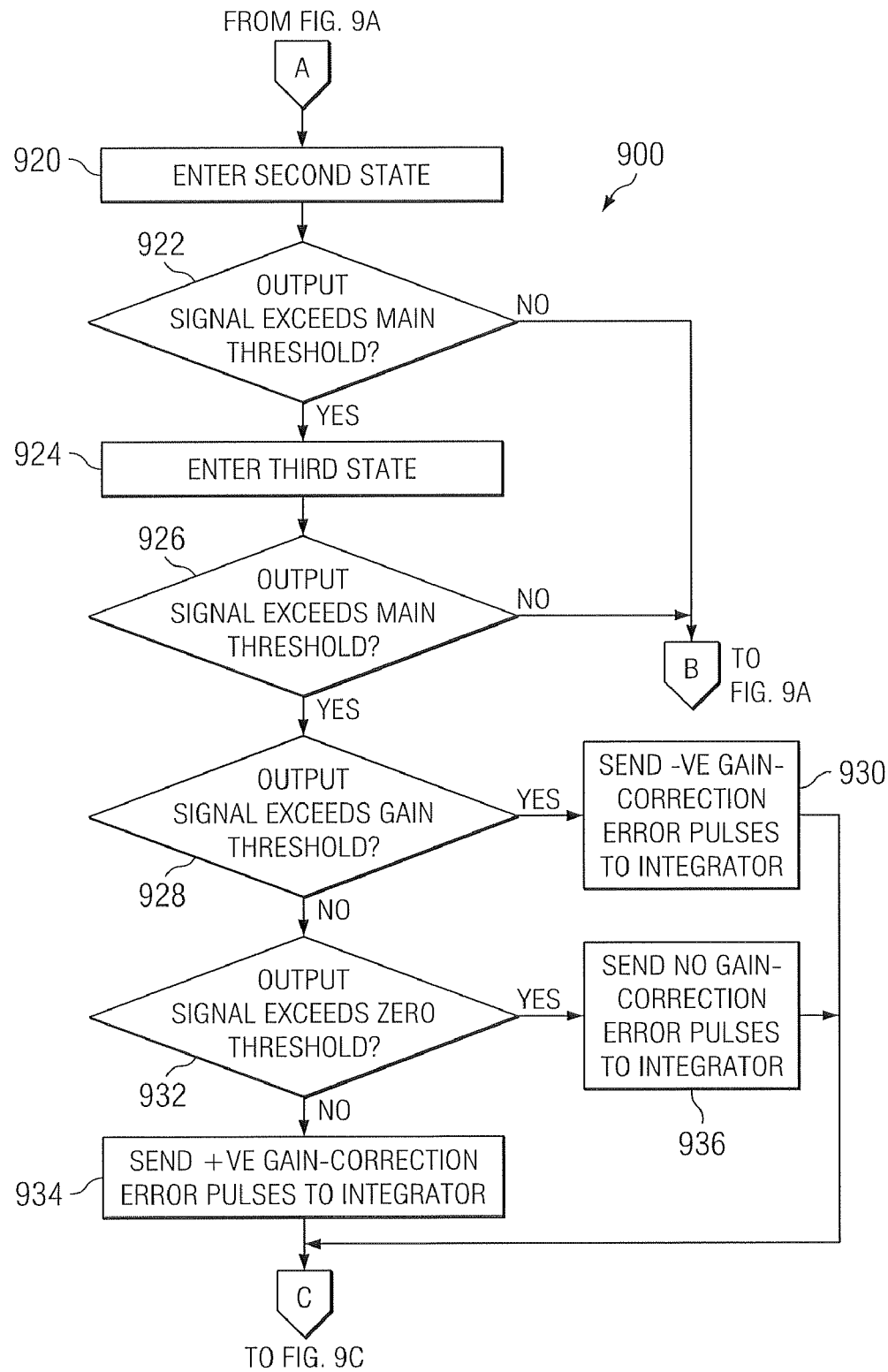

FIGS. 9A through 9C illustrate an example method 900 for adjusting a receiver filter 120 according to one embodiment of this disclosure. For ease of explanation, the method 900 is described with respect to the state machine 702 operating in the receiver 116 of the system 100 of FIG. 1. The method 900 could be used by any other device and in any other system.

In the description that follows, the state machine 702 is described as entering various states. In some embodiments, the state machine 702 is capable of changing states once each period of a clock signal. In other words, the steps described below as occurring during a single state could all be performed during a single clock cycle.

The state machine 702 enters an initial state at step 902. This may include, for example, the state machine 702 entering the initial state upon power up or when the state machine 702 begins receiving a clock signal.

The state machine 702 determines if the output signal generated by the receiver 116 exceeds a main threshold at step 904. This may include, for example, the state machine 702 receiving signals generated by the comparators 712-714, which compare the output signal 208 to the main thresholds 724-726. The main thresholds 724-726 could represent voltages of ±0.10V with a hysteresis of ±0.005V. In this example, the output signal 208 exceeds the main threshold if the output signal 208 has a voltage with an absolute value greater than 0.105V. Other values for the thresholds 724-726 could be used by the receiver 116.

If the output signal 208 does not exceed the main threshold, the state machine 702 remains in the initial state. At this point, the state machine 702 has not yet detected a valid signal.

Otherwise, the state machine 702 enters a first state at step 906. In the first state, the state machine 702 determines whether to adjust the zeros and/or pole of the transfer function provided by the filter 120 in the receiver 116. In particular, the state machine 702 determines if the output signal exceeds the gain threshold at step 908. This may include, for example, the state machine 702 receiving signals generated by the comparators 704-706, which compare the output signal 208 to the gain thresholds 716-718. The gain thresholds 716-718 could represent voltages of ±0.55V with a hysteresis of ±0.005V. In this example, the output signal 208 exceeds the gain threshold if the output signal 208 has a voltage with an absolute value greater than 0.555V. Other values for the gain thresholds 716-718 could be used by the receiver 116.

If the output signal exceeds the gain threshold, the state machine 702 generates one or more zero/pole error-correction pulses having a positive voltage at step 910. This may include, for example, the state machine 702 generating one or multiple error-correction pulses 730.

Otherwise, the output signal does not exceed the gain threshold, and the state machine 702 determines if the output signal lies between the zero and gain thresholds at step 912. This may include, for example, the state machine 702 receiving signals generated by the comparators 708-710, which compare the output signal 208 to the zero thresholds 720-722. The zero thresholds 720-722 could represent voltages of ±0.50V with a hysteresis of ±0.005V. Other values for the thresholds 720-722 could also be used by the receiver 116.

If the output signal lies between the zero and gain thresholds, the state machine 702 generates no zero/pole error-correction pulses at step 914. At this point, the pole and zeros of the filter 120 do not need adjustment.

If the output signal does not lie between the zero and gain thresholds, the state machine 702 determines if the output signal lies between the zero and main thresholds at step 916. If not, the state machine 702 returns to the initial state and waits for a valid signal. If the output signal 208 lies between the zero and main thresholds, the state machine 702 generates one or more zero/pole error-correction pulses having a negative voltage at step 918. This may include, for example, the state machine 702 generating one or multiple error-correction pulses 730.

After steps 910, 914, and 918, the state machine 702 has determined whether adjustment to the zeros and the pole of the transfer function of the filter 120 is needed. The state machine 702 then enters a second state at step 920. The second and higher states of the state machine 702 are used to determine whether to adjust the gain applied to the input signal 202 by the gain multiplier 204. As described above, in particular embodiments, the gain is adjusted only when the output signal 208 contains a pulse lasting at least three clock periods.

In the second state, the state machine 702 determines if the output signal exceeds the main threshold at step 922. If not, the output signal 208 does not contain a pulse lasting at least three periods of the clock signal. As a result, the state machine 702 returns to the initial state. Otherwise, the pulse in the output signal 208 has lasted two periods of the clock signal, and the state machine 702 enters a third state at step 924.

In the third state, the state machine 702 determines if the output signal exceeds the main threshold at step 926. If not, the output signal 208 does not contain a pulse lasting at least three periods of the clock signal, and the state machine 702 returns to the initial state. Otherwise, the pulse in the output signal 208 has lasted three periods of the clock signal, and the state machine 702 determines if the gain of the receiver 116 needs to be adjusted.

The state machine 702 determines if the output signal exceeds the gain threshold at step 928. If so, the gain of the receiver 116 is too high, and the state machine 702 generates one or more gain error-correction pulses having a negative voltage at step 930. This may include, for example, the state machine 702 generating one or multiple error-correction pulses 728.

Otherwise, the state machine 702 determines if the output signal 208 exceeds the zero threshold at step 932. If not, the gain of the receiver 116 is too low, and the state machine 702 generates one or more gain error-correction pulses having a positive voltage at step 934. If the output signal exceeds the zero threshold, the output signal falls between the zero and gain thresholds, and the state machine 702 produces no gain error-correction pulses at step 936.

At this point in the method 900, the state machine 702 has determined whether the gain of the receiver 116 needs adjustment, and the state machine 702 enters a fourth and final state at step 938. In the fourth state, the state machine 702 waits for the current pulse in the output signal 208 (which has lasted at least three clock periods) to end. Once the state machine 702 detects a transition in the output signal 208 at step 940, the state machine 702 returns to the initial state. The state machine 702 then repeats the process of adjusting the zero and pole locations and the gain of the receiver 116.

Although FIGS. 9A through 9C illustrate one example of a method 900 for adjusting a receiver filter 120, various changes may be made to FIGS. 9A through 9C. For example, the state machine 702 has been described as performing the gain adjustment steps after the output signal 208 maintains a pulse for at least three clock periods. The state machine 702 could adjust the gain at any other suitable time, such as when the output signal 208 maintains a pulse for a different number of clock periods.

Figure 10:
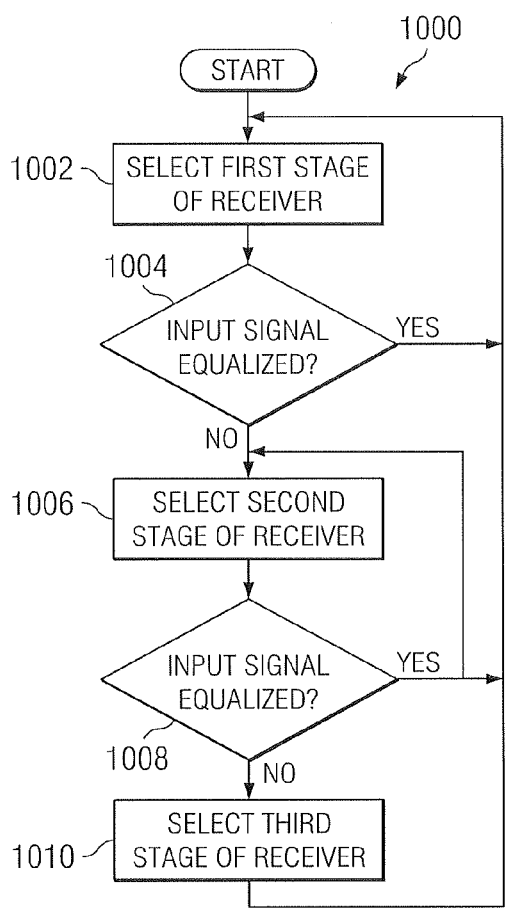
FIG. 10 illustrates an example method for selecting a number of filter stages in a receiver filter according to one embodiment of this disclosure.

FIG. 10 illustrates an example method 1000 for selecting a number of filter stages in a receiver filter 120 according to one embodiment of this disclosure. For ease of explanation, the method 1000 is described with respect to the receiver 116 of FIG. 2 operating in the system 100 of FIG. 1. The method 1000 could be used by any other device and in any other system.

The receiver 116 selects the first stage 122 of the receiver filter 120 at step 1002. This may include, for example, causing the selector 206 to select the output of the first stage 122 as the output signal 208.

The receiver 116 determines if the first stage 122 is capable of equalizing an input signal at step 1004. This may include, for example, allowing the comparators 220-222 to compare the outputs of the integrators 214-216 with the zero thresholds. If the input signal is equalized, the receiver 116 uses only the first stage 122 and returns to step 1002.

Otherwise, the receiver 116 selects the second stage 124 of the receiver filter 120 at step 1006. This may include, for example, causing the selector 206 to select the output of the second stage 124 as the output signal 208.

The receiver 116 determines if the first and second stages 122-124 are capable of equalizing the input signal at step 1008. If the input signal is equalized, the receiver 116 uses only the first and second stages 122-124 and returns to step 1002.

Otherwise, the receiver 116 needs to use all three stages 122-126 of the filter 120, and the receiver 116 selects the third stage 126 of the receiver filter 120 at step 1010. This may include, for example, causing the selector 206 to select the output of the third stage 126 as the output signal 208.

Although FIG. 10 illustrates one example of a method 1000 for selecting a number of filter stages in a receiver filter 120, various changes may be made to FIG. 10. For example, the filter 120 could include any other number of stages, such as two stages or more than three stages. Also, other techniques could be used to select the number of stages to be used in the filter 120.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A receiver comprising a filter capable of receiving an input signal and generating an output signal, the filter providing a transfer function, the filter comprising:
    a first stage capable of adjusting a pole and a first zero of the transfer function;
    a second stage capable of adjusting a second zero of the transfer function; and
    a third stage capable of adjusting a third zero of the transfer function
    wherein at least one of the second stage and the third stage comprises:
        a first resistor and a first capacitor coupled to a first input of the stage; and
        a second resistor and a second capacitor coupled to a second input of the stage;
    wherein the first resistor is an adjustable resistor and the second or third zero is based on a resistance of the first resistor,
    wherein at least one of the second stage and the third stage further comprises a gain circuit capable of preventing adjustments to the first resistor from altering a gain of the stage.

2. The receiver of claim 1, wherein the first stage comprises a plurality of differential elements, each of the differential elements capable of receiving differential input signals and generating differential output signals.

3. The receiver of claim 2, wherein each of the differential elements comprises a plurality of transistors, one of the transistors capable of receiving one of the differential input signals, another of the transistors capable of receiving another of the differential input signals.

4. The receiver of claim 3, wherein:
at least some of the transistors are capable of receiving adjustable bias currents, the adjustable bias currents altering transconductances of the at least some transistors; and
the first zero and the pole are based on the transconductances of the at least some transistors.

5. The receiver of claim 1, further comprising:
a gain multiplier capable of receiving the input signal and applying a gain to the input signal; and
an error generator capable of adjusting the gain of the gain multiplier and the transfer function of the filter.

6. A filter capable of providing a transfer function, the filter comprising:
a first stage capable of adjusting a pole and a first zero of the transfer function;
a second stage capable of adjusting a second zero of the transfer function; and
a third stage capable of adjusting a third zero of the transfer function,
wherein at least one of the second stage and the third stage comprises:
a first resistor and a first capacitor coupled to a first input of the stage; and
a second resistor and a second capacitor coupled to a second input of the stage;
wherein the first resistor is an adjustable resistor and the second or third zero is based on a resistance of the first resistor,
wherein at least one of the second stage and the third stage further comprises a gain circuit capable of preventing adjustments to the first resistor from altering a gain of the stage.

7. The filter of claim 6, wherein the first stage comprises a plurality of differential elements, each of the differential elements capable of receiving differential input signals and generating differential output signals.

8. The filter of claim 7, wherein each of the differential elements comprises a plurality of transistors, one of the transistors capable of receiving one of the differential input signals, another of the transistors capable of receiving another of the differential input signals.

9. The filter of claim 8, wherein:
at least some of the transistors are capable of receiving adjustable bias currents, the adjustable bias currents altering transconductances of the at least some transistors; and
the first zero and the pole are based on the transconductances of the at least some transistors.

10. The filter of claim 6, wherein the first capacitor, second resistor, and second capacitor are fixed.

11. The filter of claim 6, wherein the second stage has a second pole and the third stage has a third pole, the second and third poles comprising one or more fixed out-of-band frequencies.

12. A method comprising:
receiving an input signal at a filter comprising a first stage, a second stage, and a third stage, the first stage capable of adjusting a pole and a first zero of a transfer function, the second stage capable of adjusting a second zero of the transfer function, the third stage capable of adjusting a third zero of the transfer function;
generating an output signal using the filter; and
adjusting at least one of the pole, the first zero, the second zero, and the third zero,
wherein at least one of the second stage and the third stage comprises:
a first resistor and a first capacitor coupled to a first input of the stage; and
a second resistor and a second capacitor coupled to a second input of the stage; and
further comprising adjusting a resistance of the first resistor, wherein the second or third zero is based on the resistance of the first resistor,
wherein at least one of the second stage and the third stage further comprises a gain circuit capable of preventing adjustments to the first resistor from altering a gain of the stage.

13. The method of claim 12, wherein the first stage comprises a plurality of differential elements, each of the differential elements capable of receiving differential input signals and generating differential output signals.

14. The method of claim 13, wherein each of the differential elements comprises a plurality of transistors; and
further comprising:
providing at least some of the transistors with adjustable bias currents; and
altering transconductances of the at least some transistors using the adjustable bias currents, wherein the first zero and the pole are based on the transconductances of the at least some transistors.

* * * * *